United States Patent
Hagstroem et al.

(10) Patent No.: US 12,398,909 B2
(45) Date of Patent: Aug. 26, 2025

(54) DYNAMIC AIR SUPPLY SYSTEM IN A CLEAN ROOM AND A METHOD FOR PROVIDING DYNAMIC AIR FLOW

(71) Applicant: HALTON OY, Kausala (FI)

(72) Inventors: Kim Hagstroem, Kausala (FI); Ismo Groenvall, Kouvola (FI)

(73) Assignee: HALTON OY, Kausala (FI)

( * ) Notice: Subject to any disclaimer, the term of this patent is extended or adjusted under 35 U.S.C. 154(b) by 409 days.

(21) Appl. No.: 18/002,024

(22) PCT Filed: Jun. 14, 2021

(86) PCT No.: PCT/FI2021/050445
§ 371 (c)(1),
(2) Date: Dec. 15, 2022

(87) PCT Pub. No.: WO2021/255339
PCT Pub. Date: Dec. 23, 2021

(65) Prior Publication Data
US 2023/0235913 A1    Jul. 27, 2023

(30) Foreign Application Priority Data

Jun. 15, 2020   (EP) ..................................... 20179999

(51) Int. Cl.
*F24F 11/65*    (2018.01)
*F24F 3/167*    (2021.01)
(Continued)

(52) U.S. Cl.
CPC .............. *F24F 11/65* (2018.01); *F24F 3/167* (2021.01); *F24F 11/74* (2018.01); *F24F 13/06* (2013.01); *A61G 13/108* (2013.01)

(58) Field of Classification Search
CPC .. F24F 11/65; F24F 11/74; F24F 3/167; F24F 13/06
See application file for complete search history.

(56) References Cited

U.S. PATENT DOCUMENTS

2005/0250436 A1   11/2005   Nilsson
2016/0209065 A1*  7/2016    Hagström .............. G05B 15/02
(Continued)

FOREIGN PATENT DOCUMENTS

EP    3075368 A1    10/2016
JP    S55118754 A    9/1980
(Continued)

OTHER PUBLICATIONS

European Patent Office, Extended European Search Report Issued in Application No. 20179999.6, Nov. 30, 2020, Germany, 6 pages.
(Continued)

*Primary Examiner* — Mohammad Ali
*Assistant Examiner* — Vincent W Chang
(74) *Attorney, Agent, or Firm* — McCoy Russell LLP

(57) ABSTRACT

A dynamic air supply system for controlling ventilation in a clean room, wherein the clean room comprises a clean area subject to contamination, comprising a radiant panel arranged within a ceiling above the clean area, a first air supply diffuser and a second air supply diffuser arranged within the ceiling, a controller coupled with the air supply diffusers for controlling the air supply. The first air supply diffuser and the second air supply diffuser are arranged on opposite sides of the radiant panel. The first air supply diffuser and the second air supply diffuser are arranged to diffuse air flows along the radiant panel and towards clean area. The controller is configured to change the air supply diffusers between nursing mode and normal mode, wherein the supply air volume in normal mode is 10%-65% of the supply air volume in nursing mode.

14 Claims, 2 Drawing Sheets

(51) Int. Cl.
  *F24F 11/74* (2018.01)
  *F24F 13/06* (2006.01)
  *A61G 13/10* (2006.01)

(56) References Cited

U.S. PATENT DOCUMENTS

| | | | |
|---|---|---|---|
| 2016/0334120 A1* | 11/2016 | Hagström | F24F 13/26 |
| 2017/0248326 A1* | 8/2017 | Hagström | F24F 1/0047 |
| 2021/0025617 A1* | 1/2021 | Hamada | F24F 11/77 |
| 2023/0243527 A1* | 8/2023 | Hagstroem | F24F 11/65 |
| | | | 454/187 |

FOREIGN PATENT DOCUMENTS

| | | | | |
|---|---|---|---|---|
| JP | 2011200530 | A | | 10/2011 |
| JP | 2013134021 | A | * | 7/2013 |
| JP | 2013195047 | A | * | 9/2013 |
| JP | 2016211844 | A | | 12/2016 |
| WO | 2014135517 | A1 | | 9/2014 |

OTHER PUBLICATIONS

ISA European Patent Office, International Search Report Issued in Application No. PCT/FI2021/050445, Sep. 6, 2021, WIPO, 4 pages.
Japanese Patent Office, Notice of Reasons for Rejection Issued in Application No. 2022-575773, Jul. 1, 2025, 4 pages. (Submitted with Machine Translation).

* cited by examiner

DYNAMIC AIR SUPPLY SYSTEM IN A CLEAN ROOM AND A METHOD FOR PROVIDING DYNAMIC AIR FLOW

CROSS REFERENCE TO RELATED APPLICATIONS

The present application is a U.S. National Phase of International Application No. PCT/FI2021/050445 entitled "A DYNAMIC AIR SUPPLY SYSTEM IN A CLEAN ROOM AND A METHOD FOR PROVIDING DYNAMIC AIR FLOW," and filed on Jun. 14, 2021. International Application No. PCT/FI2021/050445 claims priority to European Patent Application No. 20179999.6 filed on Jun. 15, 2020. The entire contents of each of the above-listed applications are hereby incorporated by reference for all purposes.

TECHNICAL FIELD

The present invention relates to air flow systems in clean rooms.

BACKGROUND

HVAC, i.e. heating, ventilating, and air conditioning, is a technology for indoor environmental comfort. Its goal is to provide thermal comfort and acceptable indoor air quality. HVAC system design is a sub-discipline of mechanical engineering, based on the principles of thermodynamics, fluid mechanics, and heat transfer. Refrigeration is sometimes added to the abbreviation as HVAC&R or HVACR, or ventilating is dropped out as in HACR (such as in the designation of HACR-rated circuit breakers). HVAC is important in indoor design where safe and healthy building conditions are regulated with respect to temperature and humidity, using fresh air from outdoors.

Ventilating (the V in HVAC) is the process of changing or replacing air in any space to provide high indoor air quality, for example to control temperature, replenish oxygen, or remove moisture, odors, smoke, heat, dust, airborne bacteria, and carbon dioxide. Ventilation is used to remove unpleasant smells and excessive moisture, introduce outside air, to keep interior building air circulating, and to prevent stagnation of the interior air. Ventilation includes both the exchange of air to the outside as well as circulation of air within the building. It is one of the most important factors for maintaining acceptable indoor air quality in buildings. Methods for ventilating a building may be divided into mechanical or forced and natural types.

The current applications of air distribution principles for critical environments, such as clean rooms like patient and isolation rooms or other rooms, where patients are treated, are based on a simplified thinking of a zoning principle to be used in most critical (EN standard cleanrooms) environments and a dilution principle to be used in other rooms. In many cases, this thinking has led in practice to an unsatisfactory realization of the air flow pattern within the critical environments. In particular, in operating rooms where invasive methods are used to treat patients, the presence of operational personnel as a contaminant source in the proximity of the patient causes special challenges in the prevention of wound contamination. Also, the nursing staff in proximity of the patients are heavily exposed to the air exhaled by the patients. The exhaled air contains microbes, that may cause infections to nurses, as well as remains of the medication which may cause various symptoms or discomfort by smells etc. in a long term.

On the other hand, the patient in the clean room is exposed to air flows and thermal discomfort caused by powerful air flows. Thus, the present systems are usually compromise between the patient comfort and the safety of the nursing staff.

SUMMARY

The objective of the device/method is to provide a dynamic air supply system and a method for supplying a dynamic air flow in a clean room. The object is achieved by the features of the independent claims.

According to a first aspect, the present invention provides a dynamic air supply system for controlling air supply flows in a clean room, wherein the clean room comprises a clean area subject to contamination. The dynamic air supply system comprises a radiant panel arranged within a ceiling above the clean area, a first air supply diffuser and a second air supply diffuser arranged within the ceiling, a controller coupled with the air supply diffusers for controlling the air supply. The first air supply diffuser and the second air supply diffuser are arranged on opposite sides of the radiant panel. The first air supply diffuser and the second air supply diffuser are arranged to diffuse air flows along the radiant panel and towards clean area. The controller is configured to change the air supply diffusers between nursing mode and normal mode, wherein the supply air volume in normal mode is 10-65% of the supply air volume in nursing mode.

The advantage of the system is that the ventilation and the supply air flows may be adjusted in different scenarios having different needs, and to meet the requirement of thermal comfort and the safety of the people in the clean room.

In an embodiment of the system, the controller is coupled to a switch, which is configured to send signal to the controller to activate the nursing mode or the normal mode.

In an embodiment of the system, the controller is coupled to a sensor for receiving a first data from the sensor.

In an embodiment of the system, the sensor is configured to detect a person entering the clean room, number of person in the clean room and/or identification of the persons in the clean room.

In an embodiment of the system, the controller is configured to switch between the normal mode and the nursing mode automatically.

In an embodiment of the system, the first air supply diffuser, the second air supply diffuser and the radiant panel forms an integrated unit.

In an embodiment of the system, the first air supply diffuser, the second air supply diffuser and the radiant panel are separate units.

In an embodiment of the system, the air supply volume in nursing mode is 70 l/s.

In an embodiment of the system, in the normal mode the air supply volume is 30-65% of the air supply volume in nursing mode.

In an embodiment of the system, supply air temperature is lower than room air temperature.

In an embodiment of the system, the supply air temperature is −3 to −5° C. lower than the room air temperature.

According to a second aspect, the present invention provides a method for providing dynamic air flow in a clean room, wherein the clean room comprises a clean area subject to contamination, comprising steps of radiating thermal energy from a radiant panel arranged within a ceiling and above the clean area, diffusing air supply flows from a first air supply diffuser and a second air supply diffuser, arranged within the ceiling of the clean room and on opposite sides of the radiant panel, along the radiant panel and towards the clean area with air supply volume of $V_p$, initiating a nursing mode, wherein the air supply volume is increased to volume $V_n$, wherein the $V_p$ is 10-65% of the $V_n$.

In an embodiment of the method, the nursing mode is initiated manually by a user.

In an embodiment of the method, the nursing mode is initiated automatically if a first data received from a sensor correlates a set of parameters relating to person entering the clean room, person count in the clean room and/or identification of the person in the clean room.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The clean room described herein is meant to be a room where a patient is treated and there may be a source of contaminant present when the room is in use. The source of contaminant may be for example the treated patient or the nursing staff treating the patient. Examples of a clean room are an isolation room, an operating theater, a patient treatment room or a patient room. It should be understood that these are only examples and other kind of clean rooms may also be meant.

The present system is configured to provide a (one) combined controlled airflow field in a clean room that may provide substantially uniform cleanness of the indoor environmental conditions in the entire room. They may transport part of contaminants out of a clean area within the treatment area within the room by a jet momentum. They may provide the desired air velocity conditions for both contaminant control and thermal comfort for the people in the room. To achieve desired contaminant control and thermal control for the people in the clean room, it is provided a dynamic air supply system having adjustable air supply flows. The dynamic air supply system comprises a radiant panel operating together with air supply diffusers to provide thermal comfort for the patient and safety for the nursing staff in the room. By adjusting the radiant panel 2 temperature, the thermal comfort of the patient/person in the clean area may be improved.

The system is providing different operating modes, a normal mode and a nursing mode, for situations when the patient is alone in the clean room and when nursing staff is taking care of the patient in the clean room. In normal mode, when there are no other people, except the patient, in the room, the air supply volume may be adjusted lower to achieve the best thermal comfort for the patient. In nursing mode, when the patient is treated or there are some other people in the room for some other reason, the air supply volume may be adjusted larger to ensure that contaminants from the patient are not transferred towards the other people and the safety of the other people in the room is ensured. The supply air volume in a normal mode is 10-65% of the supply air volume in nursing mode.

The supply air volume in a normal mode may also be 60% of the supply air volume in nursing mode.

The supply air volume in a normal mode may also be 33% of the supply air volume in nursing mode.

The supply air volume in a normal mode may also be 33-65% of the supply air volume in nursing mode.

The clean area should be understood as a three-dimensional space around the operating area or patient area, e.g. a patient bed, extending from a floor to the ceiling. The clean area may have any form or shape as long it covers the operating area.

Figure 1:
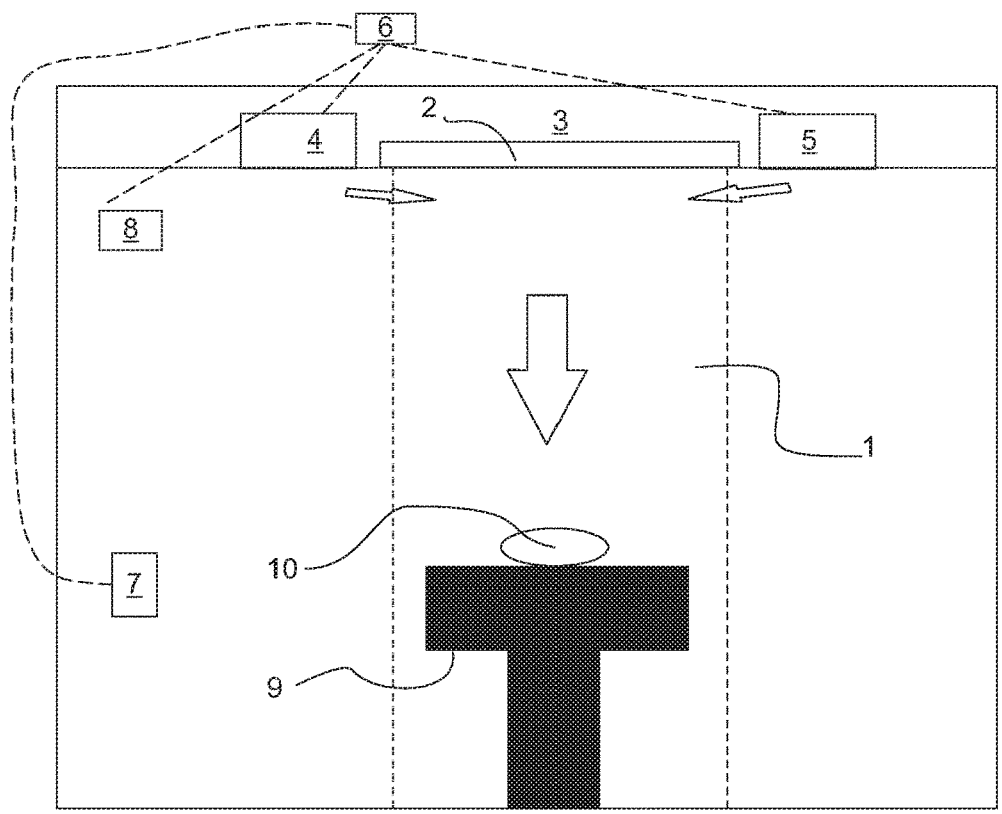
FIG. 1 shows a side view of a cross section of the dynamic air supply system in a clean room operating a normal mode.

FIG. 1 is a side view of a cross section of the dynamic air supply system in a clean room operating a normal mode. The clean room comprises a clean area 1 around the patient bed 9. The clean area extends from the floor to the ceiling. The system comprises a radiant panel 2 arranged within a ceiling 3 and above the clean area 1. A first air supply diffuser 4 and a second air supply diffuser are also arranged within the ceiling 3 so that the radiant panel 2 is located between said air supply diffusers, i.e. the first supply air diffuser 4 and the second air supply diffuser 5 are arranged on opposite sides of the radiant panel 2. The first air supply diffuser 4 and the second air supply diffuser 5 diffuse air flows along the radiant panel 2 and towards the clean area 1. Air flows are illustrated as hollow arrows in the figures. The diffused air flows are diffused into the clean area so that they merge below the radiant panel 2. The merged air flow is directed downwards towards the patient bed 9 and the patient 10 on the bed. By circulating the air flows along the radiant panel 2, the radiant panel may be used for adjusting the temperature of the merged air flow and thus, the thermal comfort of the patient may be adjusted by the radiant panel.

The system comprises a controller 6, which is configured to control the system. The controller is coupled to the air supply diffusers, e.g. the first air supply diffuser 4 and the second air supply diffuser 5, for controlling the air supply into the clean room. The controller 6 is configured to change the air supply diffusers between the nursing mode and the normal mode. The controller may be configured to adjust for example the air supply volume, ratio of the air supply volume from each air supply diffuser, temperature of the air diffused into the clean room, and/or temperature of the radiant panel.

The controller 6 may also be coupled to a switch 7, which may be used to change the modes between normal mode and nursing mode manually. For example, a nurse may switch the nursing mode on when he enters to the clean room. And again, when he leaves the room, he may switch the normal mode back on. The switch may be configured to send signal to the controller to activate between the modes.

The controller may also be coupled to a sensor 8 for receiving a first data from the sensor. The sensor may be configured to detect if a person enters the clean room, number of persons in the clean room and/or identification of the persons in the clean room. The detected information may be sent, as the first data, to the controller. Then, based on the first data, the controller may switch between the normal mode and the nursing mode automatically if the first data correlates a set of parameters, which may be person entering the clean room, person count in the clean room and/or identification of the person in the clean room, for example some specific person with identification or some number of people in the room may activate the nursing mode.

For example, the sensor may detect that a person enters the clean room. It sends the data to the controller 7, which initiate the nursing mode to increase the air supply volume into the room and to adjust the air flows so that contaminants from the patient are not transferred towards the person. The sensor may detect that the person leaves the room and sends the data to the controller 7, which initiate the normal mode back on to lower the air supply volume.

The sensor may be for example optical sensor or it may be based on wireless technology, such as rfid or bluetooth, and configured to read identification or other tags carried by the nursing staff.

The air supply volume in normal mode may be for example 40 l/s.

Supply air temperature may also be adjusted. The supply air temperature may be lower than the room air temperature. The supply air temperature may be for example −3 to −5° C. lower than the room air temperature. The supply air temperature may be adjusted by the controller. The system may comprise a first temperature sensor configured to measure the supply air temperature. The system may comprise a second sensor for measuring the room air temperature. The first and second sensors may be connected to the controller for adjusting the temperature. The controller may be connected to the estate management system to retrieve data of the room air temperature. The supply air temperature may be lower only in the nursing mode and/or it may be lowered when the nursing mode is enabled. However, the supply air temperature may also be lower in the normal mode.

Figure 2:
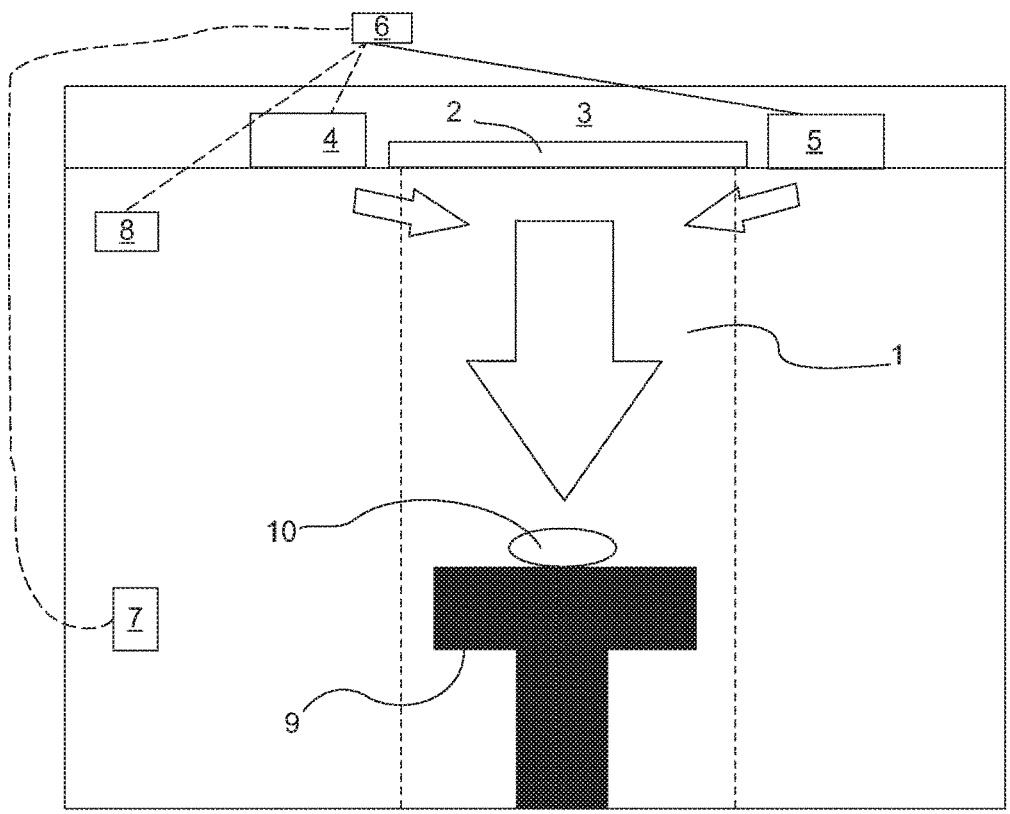
FIG. 2 is a side view of a cross section of the dynamic air supply system in a clean room operating a nursing mode.

FIG. 2 is a side view of a cross section of the dynamic air supply system in a clean room operating a nursing mode. The system operates the same way as in normal mode, but the air supply volume, diffused from the air supply diffusers, is larger. The air supply volume in nursing mode may be for example 70 or 100 l/s. The larger arrows represent larger air supply volumes within the clean room. When the air supply volume is larger and the air flows are directed as merged air flow towards the operating area and the patient, the contaminants from the patient are flown with the merged air flow towards the floor and around the clean room and, further, towards exhaust inlets. Thus, the contaminants are not flown upwards towards the persons in the room.

Figure 3:
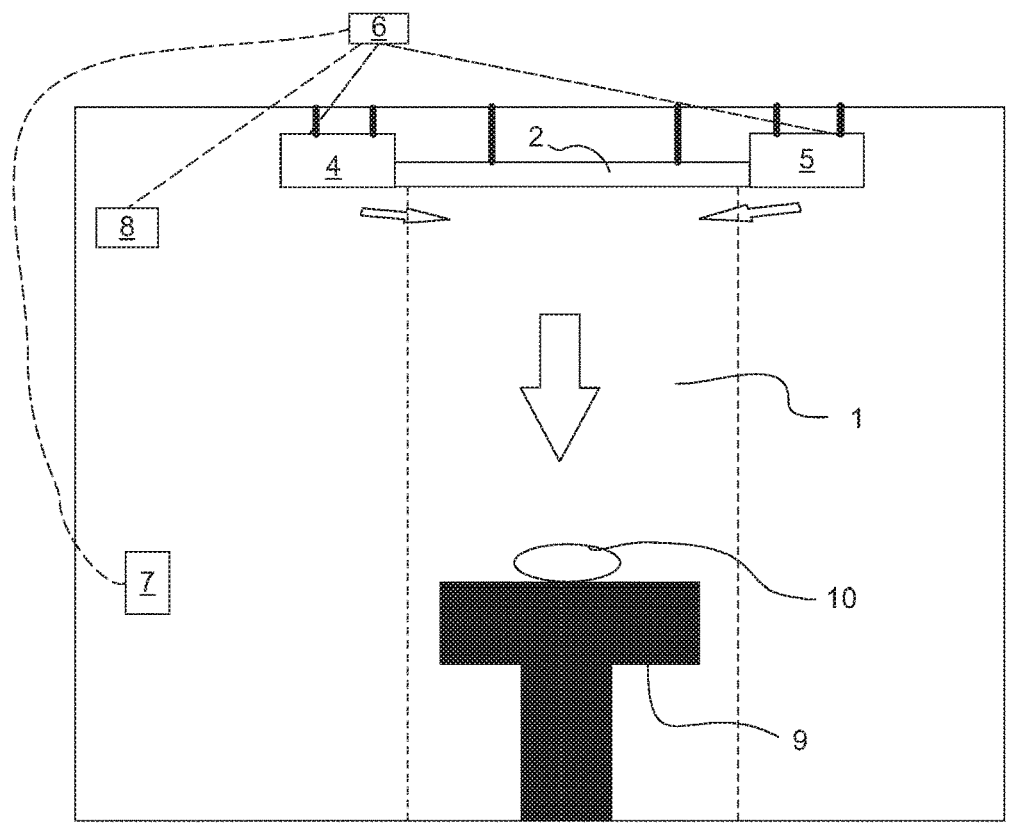
FIG. 3 shows a side view of a cross section of an embodiment of the dynamic air supply system in a clean room operating in a normal mode.
Figure 4:
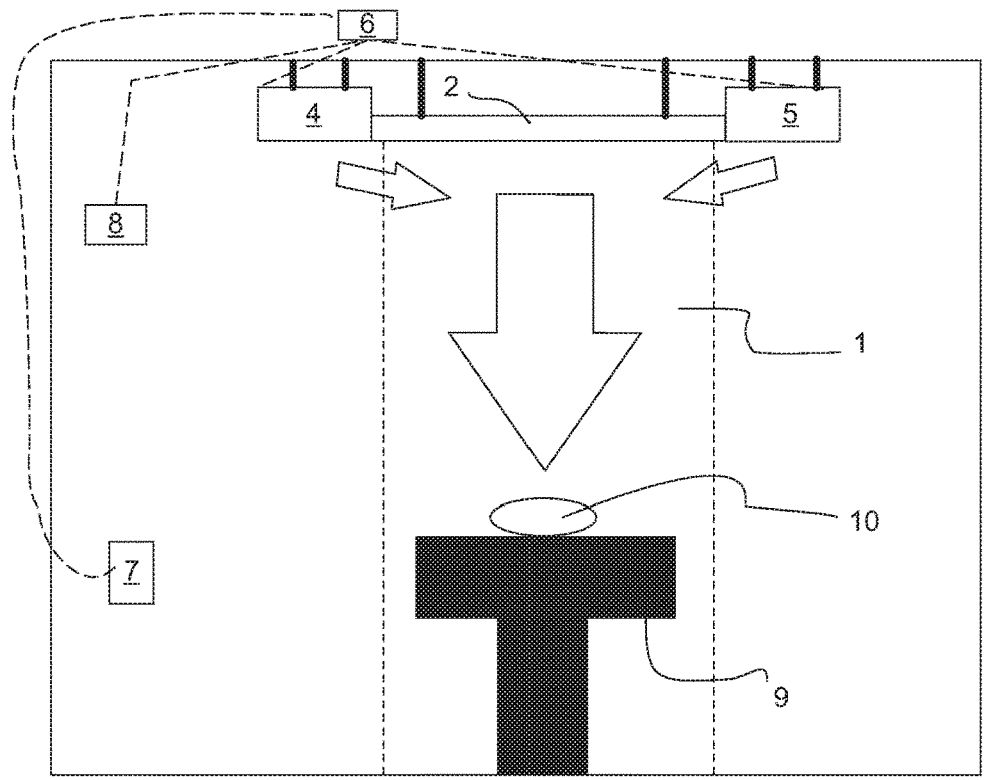
FIG. 4 shows a side view of a cross section of an embodiment of the dynamic air supply system in a clean room operating in a nursing mode.

The radiant panel 2 and/or the air diffusers may be assembled as a hanging structure, i.e. hanging from the ceiling with a space between the radiant panel/air diffusers and the ceiling as in FIGS. 3 and 4. Further, the air diffusers and the radiant panel 2 may form separate units, as in FIGS. 1 and 2. They may be also integrated unit, as in FIGS. 3 and 4.

FIG. 3 and FIG. 4 show a side view of a cross section of the dynamic air supply system in a clean room operating in a normal mode (FIG. 3) and a nursing mode (FIG. 4).

Although the invention has been the described in conjunction with a certain type of system, it should be understood that the invention is not limited to any certain type of system. While the present inventions have been described in connection with a number of exemplary embodiments, and implementations, the present inventions are not so limited, but rather cover various modifications, and equivalent arrangements, which fall within the purview of prospective claims.

The invention claimed is:

1. A dynamic air supply system for controlling ventilation in a clean room, wherein the clean room comprises a clean area subject to contamination, comprising:
a radiant panel arranged within a ceiling above the clean area,
a first air supply diffuser and a second air supply diffuser arranged within the ceiling,
a controller coupled with the first and second air supply diffusers for controlling an air supply,
wherein
the first air supply diffuser and the second air supply diffuser are arranged on opposite sides of the radiant panel,
the first air supply diffuser and the second air supply diffuser are arranged to diffuse air flows along the radiant panel and towards clean area, and
the controller is configured to change the first and second air supply diffusers between a nursing mode and a normal mode, wherein
a supply air volume in normal mode is 10-65% of the supply air volume in nursing mode.

2. The dynamic air supply system according to claim 1, wherein the controller is coupled to a switch, which is configured to send signal to the controller to activate the nursing mode or the normal mode.

3. The dynamic air supply system according to claim 1, wherein the controller is coupled to a sensor for receiving a first data from the sensor.

4. The dynamic air supply system according to claim 3, wherein the sensor is configured to detect a person entering the clean room, a number of persons in the clean room and/or identification of the persons in the clean room.

5. The dynamic air supply system according to claim 3, wherein based on the first data, the controller is configured to switch between the normal mode and the nursing mode automatically.

6. The dynamic air supply system according to claim 1, wherein the first air supply diffuser, the second air supply diffuser and the radiant panel form an integrated unit.

7. The dynamic air supply system according to claim 1, wherein the first air supply diffuser, the second air supply diffuser and the radiant panel are separate units.

8. The dynamic air supply system according to claim 1, wherein the air supply volume in nursing mode is 70 l/s.

9. The dynamic air supply system according to claim 8, wherein in the normal mode the air supply volume is 30-65% of the air supply volume in nursing mode.

10. The dynamic air supply system according to claim 1, wherein supply air temperature is lower than room air temperature.

11. The dynamic air supply system according to claim 10, wherein the supply air temperature is −3 to −5° C. lower than the room air temperature.

12. A method for providing dynamic air flow in a clean room, wherein the clean room comprises a clean area subject to contamination, comprising steps of:
radiating thermal energy from a radiant panel arranged within a ceiling and above the clean area,
diffusing air supply flows from a first air supply diffuser and a second air supply diffuser, arranged within the ceiling of the clean room and on opposite sides of the radiant panel, along the radiant panel and towards the clean area with air supply volume of $V_p$, and initiating a nursing mode, wherein the air supply volume is increased to volume $V_n$, wherein the $V_p$ is 10-65% of the $V_n$.

13. The method for providing dynamic air flow in a clean room according to claim 12, wherein the nursing mode is initiated manually by a user.

14. The method for providing dynamic air flow in a clean room according to claim 12, wherein the nursing mode is initiated automatically if a first data received from a sensor correlates a set of parameters relating to person entering the clean room, person count in the clean room and/or identification of the person in the clean room.

* * * * *